(12) United States Patent  (10) Patent No.: US 8,732,440 B2
Jacobs et al.  (45) Date of Patent: May 20, 2014

(54) DATA PATTERN GENERATOR WITH SELECTABLE PROGRAMMABLE OUTPUTS

(75) Inventors: Christopher Jacobs, Bedford, NH (US); Andreas D. Olofsson, Lexington, MA (US); Paul Kettle, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 1236 days.

(21) Appl. No.: 11/998,994

(22) Filed: Dec. 3, 2007

(65) Prior Publication Data

US 2008/0222444 A1    Sep. 11, 2008

Related U.S. Application Data

(60) Provisional application No. 60/906,000, filed on Mar. 9, 2007.

(51) Int. Cl.
   *G06F 9/30*    (2006.01)
(52) U.S. Cl.
   CPC .................................. *G06F 9/30018* (2013.01)
   USPC .......................................................... 712/224
(58) Field of Classification Search
   USPC ................................................. 712/220, 224
   See application file for complete search history.

(56) References Cited

U.S. PATENT DOCUMENTS

| | | | |
|---|---|---|---|
| 3,671,875 A | 6/1972 | Pento | |
| 3,671,945 A | 6/1972 | Maggio | |
| 3,811,092 A | 5/1974 | Charbonnier | |
| 3,889,104 A | 6/1975 | Smith | |
| 3,974,484 A | 8/1976 | Struger et al. | |
| 3,976,980 A | 8/1976 | Hertz | |
| 4,025,868 A | 5/1977 | Miki et al. | |
| 4,257,044 A | 3/1981 | Fukuoka | |
| 4,306,482 A | 12/1981 | Kashio | |
| 4,380,802 A | 4/1983 | Segar et al. | |
| 4,431,926 A | 2/1984 | Mayumi | |

(Continued)

FOREIGN PATENT DOCUMENTS

EP    0 715 252    6/1996

OTHER PUBLICATIONS

Adelman, Y. et al., "600MHz DSP with 24Mb Embedded DRAM with an Enhanced Instruction Set for Wireless Communication," International Solid State Circuits Conference 2004.

(Continued)

*Primary Examiner* — Robert Fennema
*Assistant Examiner* — William B Partridge
(74) *Attorney, Agent, or Firm* — Kenyon & Kenyon LLP

(57) ABSTRACT

A method for generating a digital signal pattern at M outputs involves retrieving an instruction from memory comprising a first set of bits identifying a first group of N outputs that includes fewer than all of the M outputs, and a second set of N bits each corresponding to a respective output included in the identified first group of N outputs. For each of the M outputs that is included in the identified first group of N outputs, the signal at the output is toggled if the one of the N bits corresponding to that output is in a first state and is kept in the same state if the one of the N bits corresponding to that output is in a second state. For each of the M outputs that is not included in the identified first group of N outputs, the signal at that output is kept in the same state.

25 Claims, 5 Drawing Sheets

(56) References Cited

U.S. PATENT DOCUMENTS

| | | | |
|---|---|---|---|
| 4,525,803 A | 6/1985 | Vidalin et al. |
| 4,587,415 A | 5/1986 | Tsunekawa et al. |
| 4,644,469 A | 2/1987 | Sumi |
| 4,719,339 A | 1/1988 | Mizuno |
| 4,843,617 A | 6/1989 | Marshall et al. |
| 5,027,315 A | 6/1991 | Agrawal et al. |
| 5,127,010 A | 6/1992 | Satoh |
| 5,129,067 A | 7/1992 | Johnson |
| 5,134,484 A | 7/1992 | Willson |
| 5,202,844 A | 4/1993 | Kamio et al. |
| 5,214,669 A | 5/1993 | Zarembowitch |
| 5,220,215 A | 6/1993 | Douglas et al. |
| 5,254,984 A | 10/1993 | Wakeland |
| 5,269,007 A | 12/1993 | Hanawa et al. |
| 5,283,863 A | 2/1994 | Guttag et al. |
| 5,295,188 A | 3/1994 | Wilson et al. |
| 5,313,644 A | 5/1994 | Matsuo et al. |
| 5,337,415 A | 8/1994 | DeLano et al. |
| 5,424,668 A | 6/1995 | Kohsaka |
| 5,432,853 A | 7/1995 | Yamamoto |
| 5,481,549 A | 1/1996 | Tokuyama |
| 5,489,918 A | 2/1996 | Mosier |
| 5,602,855 A | 2/1997 | Whetsel, Jr. |
| 5,751,984 A | 5/1998 | Chang et al. |
| 5,838,896 A | 11/1998 | Han |
| 5,850,533 A | 12/1998 | Panwar et al. |
| 5,883,592 A | 3/1999 | Schepps et al. |
| 5,898,853 A | 4/1999 | Panwar et al. |
| 5,954,811 A | 9/1999 | Garde |
| 5,954,816 A | 9/1999 | Tran et al. |
| 5,968,196 A | 10/1999 | Ramamurthy et al. |
| 5,974,500 A | 10/1999 | Maletsky et al. |
| 6,026,141 A | 2/2000 | Lo |
| 6,035,378 A | 3/2000 | James |
| 6,097,721 A | 8/2000 | Goody |
| 6,119,220 A | 9/2000 | Sato |
| 6,285,310 B1 | 9/2001 | Michaelis et al. |
| 6,378,022 B1 | 4/2002 | Moyer et al. |
| 6,427,024 B1 | 7/2002 | Bishop |
| 6,449,710 B1 | 9/2002 | Isaman |
| 6,560,754 B1 | 5/2003 | Hakewill et al. |
| 6,651,176 B1 | 11/2003 | Soltis, Jr. et al. |
| 6,841,983 B2 | 1/2005 | Thomas |
| 6,856,527 B1 | 2/2005 | Srinivasan et al. |
| 6,976,123 B2 | 12/2005 | Regev et al. |
| 7,111,152 B1 | 9/2006 | Cofler et al. |
| 7,171,631 B2 | 1/2007 | Hakewill et al. |
| 7,266,005 B2 | 9/2007 | Syed et al. |
| 7,281,119 B1 | 10/2007 | Cofler et al. |
| 7,281,147 B2 | 10/2007 | Soltis, Jr. et al. |
| 7,318,145 B1 | 1/2008 | Stribaek et al. |
| 7,418,580 B1 | 8/2008 | Campbell et al. |
| 7,493,470 B1 | 2/2009 | Cumplido et al. |
| 2002/0036765 A1 | 3/2002 | McCaffrey et al. |
| 2003/0039135 A1 | 2/2003 | Srinivasan et al. |
| 2003/0046520 A1* | 3/2003 | Dulong .................. 712/226 |
| 2003/0145216 A1 | 7/2003 | Nakane et al. |
| 2003/0194003 A1 | 10/2003 | Wittig |
| 2004/0078551 A1 | 4/2004 | Lichtenfels |
| 2004/0128436 A1 | 7/2004 | Regev et al. |
| 2004/0199745 A1 | 10/2004 | Schlansker et al. |
| 2004/0264617 A1 | 12/2004 | Goko |
| 2005/0099877 A1* | 5/2005 | Dybsetter et al. ............. 365/232 |
| 2005/0114629 A1 | 5/2005 | Altman et al. |
| 2005/0169353 A1 | 8/2005 | An et al. |
| 2005/0172180 A1 | 8/2005 | Damodaran et al. |
| 2005/0257030 A1 | 11/2005 | Langhammer |
| 2006/0077275 A1 | 4/2006 | Pan et al. |
| 2006/0123295 A1 | 6/2006 | Tanaka |
| 2006/0152980 A1 | 7/2006 | Chiueh et al. |
| 2006/0233005 A1 | 10/2006 | Schaefer et al. |
| 2007/0107774 A1 | 5/2007 | Jin et al. |
| 2007/0234150 A1 | 10/2007 | Jain et al. |
| 2007/0292103 A1 | 12/2007 | Candelore |
| 2009/0006800 A1 | 1/2009 | Bellofatto et al. |
| 2009/0066790 A1 | 3/2009 | Hammadou |
| 2009/0077109 A1 | 3/2009 | Paris |
| 2010/0329673 A1 | 12/2010 | Duan et al. |

OTHER PUBLICATIONS

Dixon, J.D. et al., "Programmable Instruction Cycle Time" *IBM Technical Disclosure Bulletin*, vol. 25, No. 5, p. 2705 (Oct. 1982).

Hennessy, J. et al., "Computer Architecture—A Quantitative Approach," Fourth Edition, Morgan Kauffman 2007.

Olofsson, A. et al., "A 4.32GOPS 1W General-Purpose DSP with an Enhanced Instruction Set for Wireless Communication," International Solid State Circuits Conferences 2002.

"Selective Register Bit Set/Reset Mechanism" *IBM Technical Disclosure Bulletin*, vol. 30, No. 12, pp. 402-405 (May 1988).

AD9920 12-Bit CCD Signal Processor with V-Driver and *Precision Timing*™ Generator.

Blackfin DSP Users Guide, http://www.analog.com/en/embedded-processing-dsp/blackfin/processors/manuals/resources/index.html.

TigerSharc DSP Users Guide, http://www.analog.com/en/embedded-processing-dsp/tigersharc/processors/manuals/resources/index.html.

* cited by examiner

| INSTRUCTION | SIZE | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|
| force_vector(RM:*)(C); | 64 | V | V | V | V | V | V | V | V | V | X | X | X | X | X | X | X | X | X | X | X | X | X | X | X | RM | RM | 0 | C | 0 | 0 | 0 | 1 | 1 | 0 |
| force_vector(<IMM16>:\*)(C); | 64 | V | V | V | V | V | V | V | V | V | — | — | — | — | — | — | — | X | X | X | X | X | X | X | X | — | — | 1 | C | 0 | 0 | 0 | 1 | 1 | 0 |
| toggle_vector(RM:*)(C)(R); | 64 | V | V | V | V | V | V | V | V | V | X | X | X | X | X | X | X | X | X | X | X | X | X | X | X | RM | RM | 0 | C | R | 0 | 1 | 1 | 1 | 1 |
| toggle_vector(<IMM16>:\*)(C)(R); | 64 | V | V | V | V | V | V | V | V | V | — | — | — | — | — | — | — | X | X | X | X | X | X | X | X | — | — | 1 | C | R | 0 | 1 | 1 | 1 | 1 |
| toggle_vector(RM:*)(C)(R); | 32 | V | V | V | V | V | V | V | V | V | V | B2 | B1 | B0 | X | X | X | X | X | X | X | X | X | X | X | RM | RM | 0 | C | R | 1 | 1 | 1 | 1 | 1 |
| toggle_vector(<IMM14>:\*)(C)(R); | 32 | V | V | V | V | V | V | V | V | V | V | B2 | B1 | B0 | X | X | X | X | X | X | X | X | X | X | X | X | X | 1 | C | R | 1 | 1 | 1 | 1 | 1 |
| toggle_vector(R0:*); | 16 | X | X | X | X | X | X | X | X | X | X | X | X | X | X | X | X | V | V | V | V | N3 | N2 | N1 | N0 | 0 | 1 | 1 | 1 | 1 | 1 | 1 | 1 |

312 — {rows 1–4}
314 — {rows 5–6}
316 — {row 7}

Legend:
C = clear option
R = relative option
RC bit combination reserved for
16 bit toggle instruction
Bx = Byte select
Nx = Nibble select
RM = Register select
I = Immediate
V = Vector bit
X = Ignored bit
IMM16 = 16 bit binary value
IMM14 = 14 bit binary value

FIG. 4

DATA PATTERN GENERATOR WITH SELECTABLE PROGRAMMABLE OUTPUTS

RELATED APPLICATIONS

This application claims the benefit under 35 U.S.C. §119 (e) of U.S. Provisional Application Ser. No. 60/906,000, filed Mar. 9, 2007 ("the '000 application"). This application also relates to the subject matter disclosed in U.S. patent application Ser. No. 11/818,449, filed Jun. 14, 2007 ("the '449 application). The entire contents of each of the '000 and '449 applications are incorporated herein by reference.

BACKGROUND

Charge coupled devices (CCDs) are used in a large variety of digital imaging applications. There are a number of different manufacturers of such devices and each manufacturer typically has numerous models. The large variety of CCDs and the continuously evolving CCD control requirements have caused challenges in designing the analog front end/CCD controller circuits that will have significant longevity in the market place. This problem is ameliorated to a large extent by the software programmable pattern generator described in the '000 and '449 applications, incorporated by reference above. That software programmable pattern generator utilizes a compact and flexible assembly programmable Reduced Instruction Set Computer (RISC) that is optimized for generating high precision timing pulses and low power control functions. The architecture has a variable bit wide instruction set that includes: vector toggling instructions, jump instructions, conditional instructions, arithmetic instructions, and load/store instructions. The pattern generator can fetch and execute one instruction per clock cycle, and is parameter scalable to allow for easy optimization in different applications.

To allow every chip output to be set simultaneously at a pixel clock resolution, a large number of bits may be stored in parallel within the program memory, with each bit in a vector word corresponding to an output pin that can be selectively toggled, depending on the state of the bit. In the case of Analog Device's model number ADDI9000, this meant that every instruction was "64" bits wide. An advantage of this model was in the simple control and design logic required. We have since recognized, however, that the use of such large instructions consumes a significant amount of memory, thus imposing limits on the utility of the timing generator for certain applications.

SUMMARY

According to one aspect of the present invention, a method for generating a digital signal pattern at M outputs involves retrieving a first instruction from memory comprising a first set of bits identifying a first group of N outputs that includes fewer than all of the M outputs, and a second set of N bits each corresponding to a respective output included in the first group of N outputs identified by the first set of bits included in the first instruction. For each of the M outputs that is included in the first group of N outputs identified by the first set of bits included in the first instruction, the signal at the output is toggled if the one of the N bits corresponding to that output is in a first state and is kept in the same state if the one of the N bits corresponding to that output is in a second state. For each of the M outputs that is not included in the first group of N outputs identified by the first set of bits included in the first instruction, the signal at that output is kept in the same state.

According to another aspect of the invention, an apparatus for generating a digital signal pattern at M outputs comprises a circuit configured and arranged to retrieve at least instructions of a first type from memory and to control the toggling of signals at the M outputs in response thereto, wherein each of the instructions of the first type comprises a first set of bits identifying a first group of N outputs that includes fewer than all of the M outputs, and a second set of N bits each corresponding to a respective output included in the first group of N outputs identified by the first set of bits included in the first instruction. The circuit is further configured and arranged to process each retrieved instruction of the first type such that, for each of the M outputs that is included in the first group of N outputs identified by the first set of bits included in the instruction, the signal at the output is toggled if the one of the N bits corresponding to that output is in a first state and is kept in the same state if the one of the N bits corresponding to that output is in a second state, and, for each of the M outputs that is not included in the first group of N outputs identified by the first set of bits included in the instruction, the signal at that output is kept in the same state.

According to another aspect, a method for generating a digital signal pattern at M outputs involves retrieving a first instruction from memory that consists of N bits, and retrieving a second instruction from memory that consists of fewer than N bits. Based on the first instruction, first ones of the M outputs are identified and the signals on those outputs are toggled. Based on the second instruction, second ones of the M outputs are identified and signals on those outputs are toggled.

BRIEF DESCRIPTION OF THE DRAWINGS

FIGS. 3 and 4 illustrate the format and content of several examples of toggle instructions that may be employed in some embodiments.

DETAILED DESCRIPTION

Figure 1:
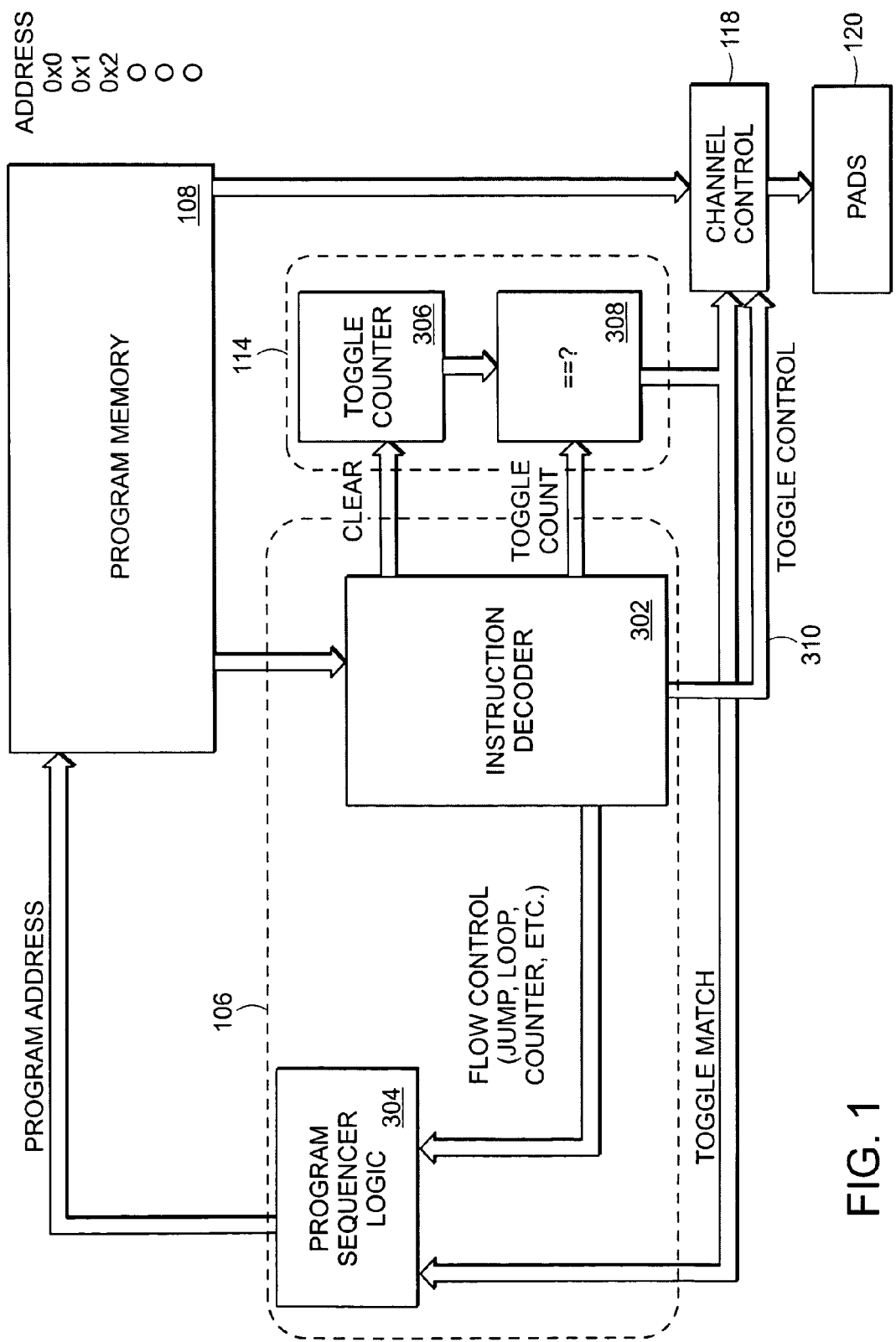
FIG. 1 is a functional block diagram illustrating various components of a digital pattern generator (DPP) that may operate together to control the generation of a digital signal pattern at its outputs.

This disclosure is directed to improvements to certain components and features of the system disclosed in the '449 application (incorporated by reference above). Familiarity with the entirety of the disclosure of the '449 application will thus be assumed. For ease of understanding, to the extent practicable this disclosure will use the same reference numerals as those used in the '449 application to describe similar components and features. It should be appreciated, moreover, that the components and features in this disclosure that are similarly named or that are designated using the same reference numerals as the components or features described in the '449 application may be used in the system described in the '449 application in the same or similar manner as such similarly named or labeled components and features are used therein.

That only certain key components of the system disclosed in the '449 application are re-described herein should not be understood to mean that such components and features are incompatible in any way with the new or modified components or features disclosed herein. Rather, it is simply for conciseness that only those components and features of the system disclosed in the '449 application that are directly impacted or modified by this disclosure are re-described herein.

Figure 3:
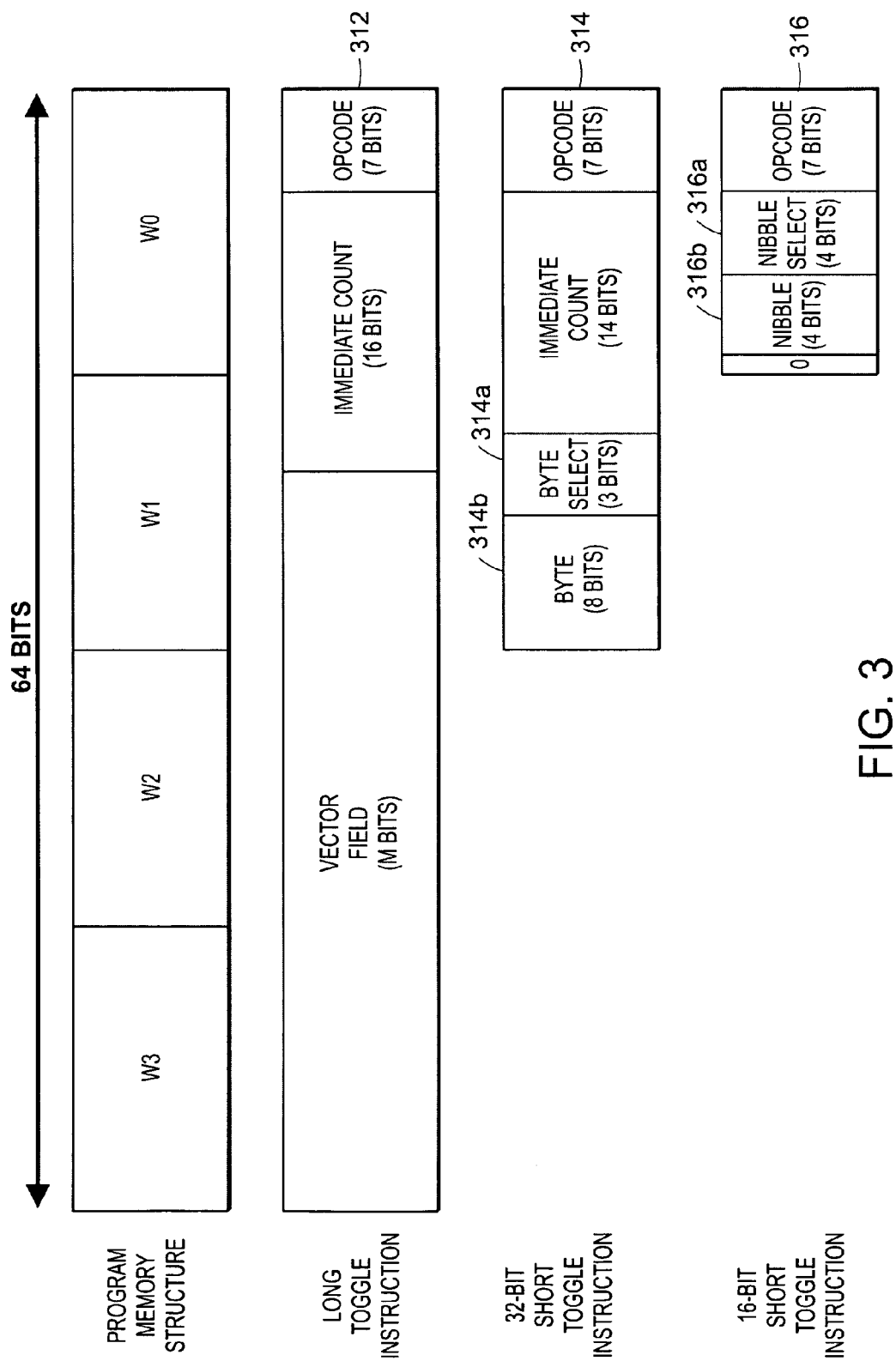

FIG. 1 is similar to FIG. 3 of the '449 application. The only pertinent difference between the two figures is the addition of toggle control lines 310 to the diagram of FIG. 1. The purpose of these additional control lines will be explained in more detail below. This figure is a functional block diagram illustrating various components of a digital pattern processor (DPP) (like the DPP 102 described in the '449 application—incorporated by reference above) that may operate together to control the generation of a digital pattern of signals at a group of outputs. As shown, the DPP may comprise a program sequencer 106, a synchronous timer 114, a program memory 108, channel control circuitry 118, and output pads 120.

As illustrated, the program sequencer 106 may comprise an instruction decoder 302 and program sequencer logic 304 that together are responsible for fetching instructions from the memory 108, decoding the fetched instructions, and controlling the synchronous timer 114 and channel control circuitry 118 so as to appropriately generate a pattern of digital signals at the outputs 120. In the example shown, the synchronous timer 114 comprises a toggle counter 306 and a comparator 308. The comparator 308 may, for example, determine when the toggle counter 114 has reached a specified "toggle count" value. The toggle counter 306 may, for example, comprise a sixteen-bit free-running clock cycle counter. An illustrative example of an execution flow that may be employed by these components to generate a pattern of pulses by toggling the signals at the outputs 120 and/or forcing the signals at the outputs 120 to particular values is discussed below in connection with FIG. 2.

Figure 2:
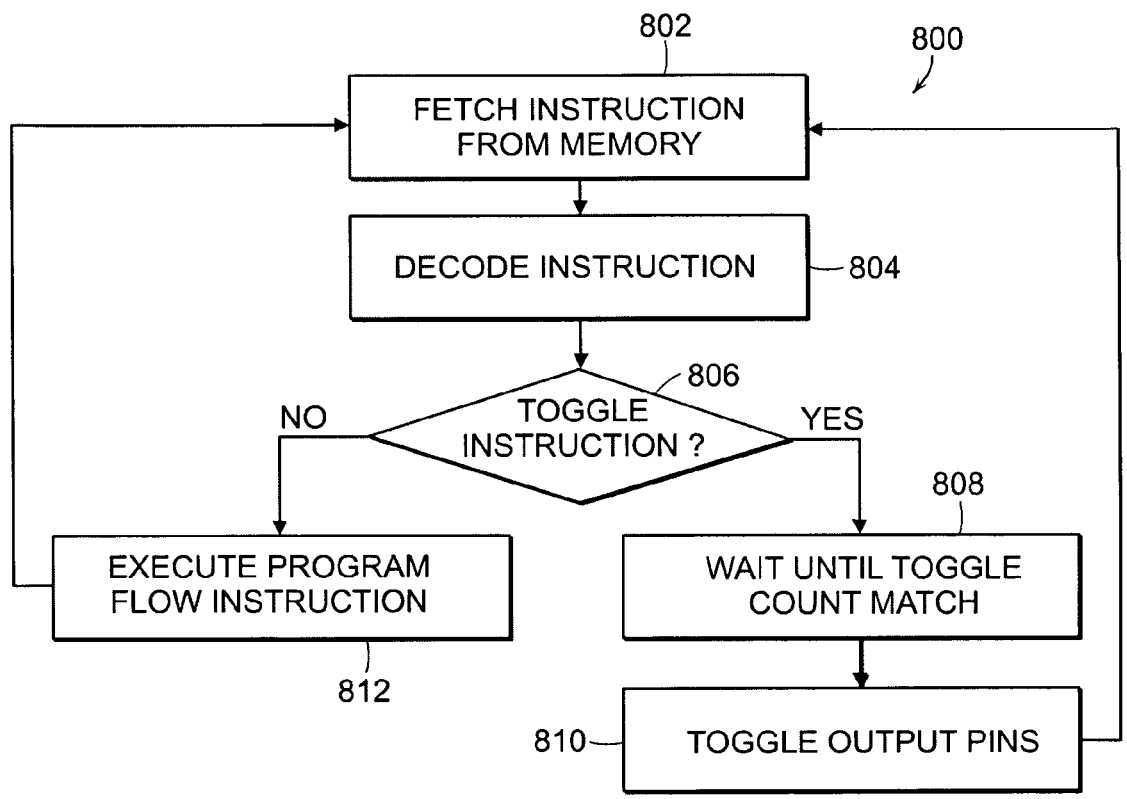
FIG. 2 is a flowchart illustrating an example of an execution flow that may be used to generate a pattern of pulses on the outputs of the DPP.

FIG. 2 is identical to FIG. 8 of the '449 application. This figure is a flowchart illustrating an example of an execution flow 800 that may be used to generate a digital signal pattern on the outputs 120. In the example shown, at steps 802 and 804, an instruction is fetched from the program memory 108 and decoded for execution. If, at a step 806, it is determined that the instruction is a toggle instruction, then the flow 800 proceeds to a step 808, where it waits until the comparator 308 has determined that the toggle counter 306 has reached a toggle count value. As discussed in more detail below, the toggle count value may be either included in the toggle instruction itself or may be read from a register of the DPP (e.g., one of the general purpose registers R0-R7 identified in Table 1 in the '449 application). When the toggle count value is to be read from a register, either the same register may be referenced each time a particular type of toggle instruction is received or one or more bits may be included in the toggle instruction that identify the register that is to be referenced. As used herein, a "toggle instruction" refers to any instruction that is responsible for determining the state of one or more of the outputs 120 and is thus intended to encompass not only instructions that cause the signals at particular outputs to "toggle" (i.e., to change from one state to another) but also instructions that force the signals at particular outputs 120 to particular values (sometimes referred to herein as "force vector" instructions) and thus may or may not actually cause the output signals to toggle, depending on the initial state of each such signal.

Once the toggle counter 306 has reached the specified toggle count, the flow proceeds to a step 810, where certain outputs 120 of the DPP are simultaneously toggled or forced to particular values in the manner specified by the instruction. The flow then returns to the steps 802 and 804 where the next program instruction is fetched and decoded.

If, at the step 806, it is determined that the fetched instruction is not a toggle instruction, then the routine proceeds to a step 812, where the instruction is carried out to as to control the program flow in the manner specified. (Examples of the manner in which particular toggle instructions and program flow instructions may be configured and carried out in various embodiments are described in detail in the '449 application and thus will not be repeated here). Accordingly, by employing the configuration and functionality illustrated in FIGS. 1 and 2, the toggle counter 306 and a custom toggle instruction set may be used to keep the DPP in lock step execution to allow the generation of a digital signal pattern in the manner specified by the instruction set. Advantageously, in the example shown, the flow is capable of toggling or forcing the values of the signals on all output pins on any given clock cycle. In some embodiments, a single instruction may be defined for toggling or forcing the values of all of the output bits simultaneously.

As noted in the '449 application, one application of the DPP may be as a timing generator for an image sensor. Examples of environments in which such a timing generator may operate are described in U.S. Pat. No. 6,512,546, U.S. Pat. No. 6,570,615, and U.S. Patent Application Publication No. 2006/0077275 A1, each of which is incorporated herein by reference in its entirety.

FIG. 3 shows several examples of program instruction configurations that may be used in various embodiments of the DPP disclosed herein, as well as in the '449 application, including two examples of "short" toggle instruction formats 314 and 316 that were not disclosed in the '449 application. In some embodiments, the program memory 108 that is employed may have a fixed width that is segmented into several sections. In the example of FIG. 3, for instance, the program memory is "64" bits wide and is segmented into four sections W0, W1, W2, and W3. The format of the "long" toggle instruction 312 may be just like that of the toggle instructions described in the '449 application and may be used in a similar manner. Advantageously, the short toggle instructions 314 and 316 may be used (in the manner described below) in circumstances in which it is necessary to toggle only a particular subset of the bits of the output vector. In the example of FIG. 3, for instance, the 32-bit short toggle instruction 314 may be used to toggle any or all of the bits within a particular byte (i.e., a set of eight bits) of the output vector, and the 16-bit short toggle instruction 316 may be used to toggle any or all of the bits within a particular nibble (i.e., a set of four bits) of the output vector. For the 32-bit short toggle instructions 314, a group of three byte select bits 314*a* may be used to identify the group of eight output bits that is to be toggled as indicated by the bits in the byte field 314*b*. Similarly, for the 16-bit short toggle instructions 316, a group of four nibble select bits 316*a* may be used to identify the group of four output bits that is to be toggled as indicated by the bits in the nibble field 316*b*.

Although the instructions 312, 314, 316 in the illustrated example are eight bytes, four bytes, and two bytes wide, respectively, it should be appreciated instructions of different lengths and relative sizes could additional or alternatively be employed. In some embodiments, for example, the short toggle instructions may be two and four bytes long, respectively, just as in the primary example described herein, but the long toggle instructions may be ten rather than eight bytes wide, with the two extra bytes containing additional bits of the vector field. Such a configuration would allow the generation of a digital pattern on "57" output pins, rather than on only "41" pins as in the primary example described herein.

To simply the implementation of hardware components in the system, it may be useful to align the longer instructions in memory so as to allow each instruction to be fetched in a single memory access. For example, if a memory including one thousand lines of sixty four bits is employed, each 64-bit instruction may be aligned so that it starts at the beginning of a line, rather than wrapping from one line to another. It may also be advantageous to align the 32-bit instructions in the above example so that they also do not wrap around from one memory line to another. For instructions that are aligned in such a manner, appropriate instructions may be inserted into the program code that cause the program counter to be incremented by a specific amount to account for the adjusted alignment (e.g., by skipping over one or more of the sections W1, W2, W3 of the memory line, which may simply remain unused).

In some embodiments, it can be advantageous to use instructions having lengths that are integer multiples of one another. In one of the examples above, for instance, the length of the 32-bit short toggle instruction is twice (or a power of two) greater than the length of the 16-bit short toggle instruction, and length of the 64-bit long toggle instruction is twice (or a power of two) greater than the length of the 32-bit short toggle instruction. The use of such "power of two" differences between instruction lengths may, for example, simply the process of fetching and decoding of instructions. For instance, in some embodiments, the mechanism used for fetching may only have to choose between incrementing the program counter by "1," "2," or "4," which in binary becomes "001," "010," and "100," respectively.

FIG. 4 is a chart showing several examples of specific toggle instructions of the above-described types that may be employed in certain embodiments. In the chart, the numbers "0" to "31" in the row labeled "INSTRUCTION" correspond to the respective bits in the depicted instruction words. For example, the numbers "0" to "6" in the "INSTRUCTION" row of FIG. 4 correspond to the 7-bit operational codes ("opcodes") of the toggle instructions 312, 314, 316 of FIG. 3. For the long (i.e., 64-bit or longer) toggle instructions in the chart, it should be understood that, although not specifically depicted, the bits "32" to "63" (or higher) would be "vector bits" just like the bits "23" to "31" in those examples.

The opcode in each instruction may identify not only whether the instruction is a "toggle instruction," as opposed to one of the other types of instructions described in the '449 application, e.g., a program flow instruction, a load/store instruction, an arithmetic instruction, etc., but also the particular length and content of the toggle instruction. For example, the opcode may indicate whether the instruction is a long toggle instruction 312 (which may be either an instruction to toggle certain bits or instruction to force certain bits to particular values), a 32-bit short toggle instruction 314, or a 16-bit short toggle instruction.

In the examples of FIG. 4, the assertion of bits "1" and "2" of the opcode indicates that the instruction is a toggle instruction. The assertion of bit "0" in addition to bits "1" and "2" indicates that the toggle instruction is a "force vector" instruction. The assertion of bit "3" in addition to bits "1" and "2" indicates that the toggle instruction is "short" (i.e., either "32" bits or "16" bits) rather than "long" (i.e., "64" bits or more). The assertion of both of bits "4" and "5" in addition to bits "1, "2," and "3" indicates that the short toggle instruction is "16" bits long rather than "32" bits long. (Because the "clear" and "relative" options are never simultaneously asserted for a short toggle instruction 314, the assertion of both such bits may be used for this purpose).

As shown, the long toggle instructions 312 and the 32-bit short toggle instructions 314 may also each include an "immediate count" field. This field may, for example, be used to identify the "toggle count" value that the toggle counter 306 must reach for an output event (e.g., a toggling of specified output bits or forcing of output bits to particular values) to occur. Alternatively, some or all of the same bits may be used to identify a particular register (e.g., one of the general purpose registers R0-R7 identified in Table 1 of the '449 application) that contains the toggle count value that is to be used for such a purpose. In the examples shown in FIG. 4, the assertion of bit "6" in an instruction opcode indicates that the toggle count value is to be determined from the bits in the "immediate count" field (i.e., the bits labeled "I"), rather looking to bits "7" to "9" (i.e., the bits labeled as "RM") to identify the register containing the toggle count value. In the illustrative example shown, the 16-bit toggle instruction does not include either an "immediate count" field or a set of bits identifying a register. Instead, the DPP knows to look by default to a specific register (e.g., the general purpose register R0 identified in Table 1 of the '449 application) for the toggle count value that is to be used when such an instruction is received.

Figure 5:
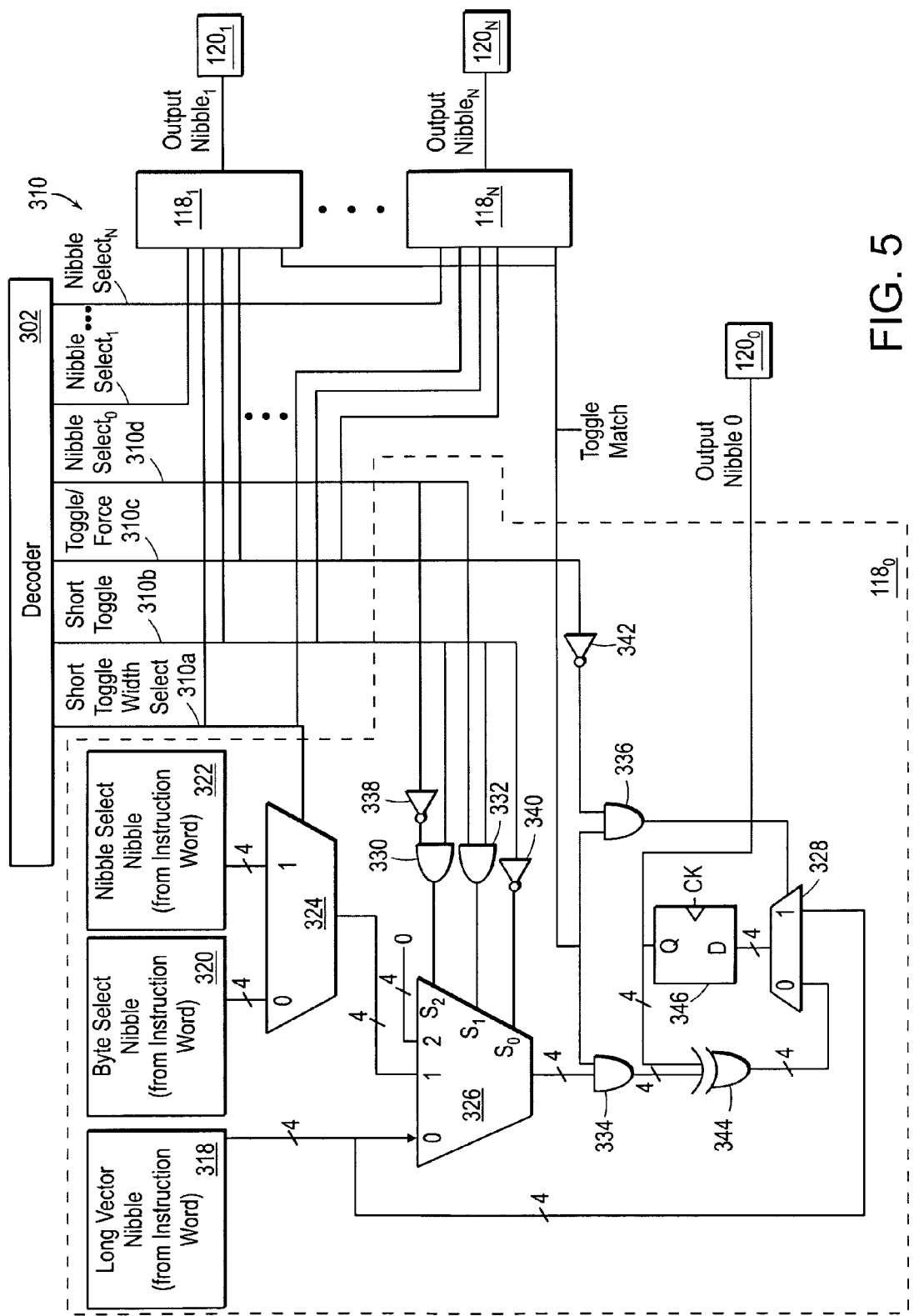
FIG. 5 is a block diagram illustrating an example of hardware that may be employed by the channel control circuit of the DPP to enable the use of toggle instructions of various lengths and types.

FIG. 5 shows an example of channel control circuitry 118 that may be employed in the DPP to facilitate the implementation of short toggle instructions in addition to long toggle instructions. Although the details of only channel select circuit $118_0$ associated with the output pads $120_0$ will now be described, it should be appreciated that the other channel select circuits $118_1$ to $118_N$ associated with the other output pads $120_1$ to $120_N$, respectively, may include the same or similar circuitry. As shown, in the illustrated example, the channel select circuit $118_0$ includes three multiplexers 324, 326, 328, four AND gates 330, 332, 334, 336, three inverters 338, 340, 342, an XOR gate 344, and a flip-flop 346.

In the illustrated example, the channel control circuitry 118 includes a separate circuit $118_0$, $118_1$, $118_N$ for each nibble (i.e., group of four bits) that is provided at a respective group of four output pads $120_0$, $120_1$, $120_N$ of the DPP. As shown, each of the channel control circuits $118_0$, $118_1$, $118_N$ may be provided with toggle control signals 310 from the decoder 302, as well as a "toggle match" signal from the comparator 308 of the synchronous timer 114. Vector data from a particular part of the instruction being executed is also supplied to each channel control circuit $118_0$, $118_1$, $118_N$ as indicated by blocks 318, 320, and 322. For example, with reference to FIGS. 3 and 4, each block 322 may be provided with bits "11" to "14" of every executed instruction (which, for 16-bit short toggle instructions 316, corresponds to the "nibble" field 316b in FIG. 3), each block 320 may be provided with either bits "24" to "27" or bits "28" to "31" of every executed instruction that includes such bits (which, for 32-bit short toggle instructions 314, corresponds to one half of the "byte" field 314b in FIG. 3), and each block 318 may be provided with a different group of four bits from the "vector field" of every executed long instruction that includes such bits.

A sufficient number of channel select circuits $118_0$, $118_1$, $118_N$ may be employed to provide four different bits from the long instruction vector field (e.g., bits "23" to "63" in the example of FIG. 4) to the respective blocks 318 of such circuits. For example, the bits provided to the block 318 of the circuit $118_0$ may correspond to bits "23" to "26" of a received instruction, the bits provided to the same block of the circuit $118_1$ may correspond to the bits "27" to "30" of the received instruction, and so on. Because each channel control circuit $118_0$, $118_1$, $118_N$ may be permanently associated with and responsible for driving a respective group of four output pads $120_0$, $120_1$, $120_N$, the same group of bits from each instruction word may be provided to the same blocks 318, 320, 322 of a particular channel control circuit $118_0$, $118_1$, $118_N$ every time a new instruction is decoded.

In the example shown, when the short toggle line 310b is low (indicating that the decoded instruction is not a short toggle instruction 314, 316), the multiplexer 326 is controlled (via the inverter 340) to provide the contents of the block 318 to one of the inputs of the AND gate 334. (If the opcodes shown in FIG. 4 are employed, then the decoder 306 may simply provide bit "3" of the opcode as the control signal on the short toggle line 310b). If a toggle match signal is received from the synchronous timer 114 when the circuit is in such a state (and the toggle/force line 310c is high), then the signals at the outputs $120_0$ will be caused to toggle in the manner specified by the bits in the block 318. It should be appreciated that all of the other channel control circuits $118_1$ to $118_N$ may similarly selectively cause the signals on their corresponding output pads $120_1$ to $120_N$ toggle at the same time when a toggle match signal is received from the synchronous timer 114, thus causing all of the outputs of the DPP to toggle at the same time as indicated in the vector field of the received instruction.

In the illustrated example, the short toggle width select line 310a from the decoder 302 controls the multiplexer 324 to select either the four bits from the block 320 or the four bits from block 322 as an input to the multiplexer 326. As noted above, the four bits from the block 322 may be selected when a 16-bit toggle instruction is being processed, and the four bits from the block 320 may be selected when a 32-bit toggle instruction is being processed. (If the opcodes shown in FIG. 4 are employed, then the decoder 306 may generate an appropriate control signal on the select line 310a, for example, simply by performing a logical AND operation on bits "4" and "5" of the opcode of the received instruction.)

The "nibble select line" for each channel select circuit (e.g., nibble select $line_0$ 310d for channel select circuit $118_0$) may be asserted when the decoder 302 determines (e.g., by examining the bits in the nibble select field 316a or the byte select field 314a) that the particular output nibble for which the channel control circuit is responsible has been selected for toggling. With reference to FIGS. 3 and 4, for example, the nibble select $line_0$ 310d may be asserted if either (1) the nibble select bits 316a (i.e., bits "7" to "10" in FIG. 4) in a 16-bit short toggle instruction 316 identify the particular output nibble for which the channel control circuit $118_0$ is responsible, or (2) the byte select bits 314a (i.e., bits "20" to "23" in FIG. 4) in a 32-bit short toggle instruction 314 identify an output byte containing the particular output nibble for which the channel control circuit $118_0$ is responsible. Thus, for 16-bit short toggle instructions 316 (which can select one or more bits within only a single nibble for toggling), the nibble select line of only a single channel control circuit $118_0$, $118_1$, $118_N$ will be asserted. For 32-bit short toggle instructions 314 (which can select one or more bits within only a single byte for toggling), the nibble select lines of only the two channel control circuits $118_0$, $118_1$, $118_N$ responsible for driving the bits of the selected output byte will be asserted.

As shown in FIG. 5, the short toggle select line 310b and nibble $select_0$ line 310d from the decoder 302 may together control the multiplexer 326 (via AND gates 330, 332 and inverters 338, 340) to select one of: (1) the four bits from the block 318, (2) the selected four bits from the multiplexer 324, and (3) a set of four zeros. If the decoded instruction is a toggle instruction 312, 314, 316, then the selected one of these three inputs will determine how the four output bits for which the channel select circuit $118_0$ is responsible are to be toggled (unless the signal on the toggle/force line 310c indicates that the toggle instruction is a force vector instruction) upon receipt of a toggle match signal from the synchronous timer 114.

When the toggle/force line 310 is low, the inverter 342 supplies a high signal to one of the inputs of the AND gate 336. Thus, when a toggle match signal is received from the synchronous timer 114, the AND gate 336 causes the multiplexer 328 to select the long vector nibble block 318, rather than the output of the XOR gate 344, as the input to the flip-flop 346, and thus causes the values of the long vector nibble block 318 to be forced upon the output pads $120_0$ rather than allowing the four bits from the multiplexer 326 to determine how the outputs should be toggled. (If the opcodes of FIG. 4 are employed, then the decoder 306 may simply provide bits "3" and "0" of the opcode as the control signals on the short toggle line 310b and the toggle/force line 310c, respectively).

In the example circuit shown, receipt of a toggle match signal will cause the AND gate 334 to provide the four bits from the multiplexer 326 to one of the inputs of the XOR gate 344. The XOR gate 344, in turn, causes the four bits held by the "Q" output of the flip-flop 346 to be toggled as specified by those four bits (provided the toggle/force line 310c is high). If the nibble $select_0$ line 310d is low when the short toggle select line 310b is high (indicating that the instruction is either a 16-bit short toggle instruction 316 or a 32-bit short toggle instruction 314) and the toggle/force select line 310c is also high, then the multiplexer 326 provides four zeros to the input of the AND gate 334, thus causing the outputs of that particular nibble to maintain their current state, and not be toggled, when the toggle match signal is received. If, however, the nibble $select_0$ line 310d is high (indicating that the decoder has determined that the particular output nibble for which the channel control circuit $118_0$ is responsible has been selected for toggling) when the short toggle select line 310b and toggle/force select line 310c are both high, then the multiplexer 326 provides the four output bits of multiplexer 324 to the input of the AND gate 344, thus resulting in the output bits of that particular output nibble being toggled as indicated by those bits when the toggle match signal is received.

In some embodiments, a pattern generation program may be written using only "long" toggle instructions (several examples of such programs were disclosed in the '449 application, incorporated by reference above) and the determination of which long toggle instructions can be converted into either 16-bit or 32-bit short toggle instructions can be left to the timing generator assembler (TGASM). For example, any toggle instructions that require the toggling of one or more bits from only a single byte may be compressed into a 32-bit toggle instruction. Similarly, any toggle instructions that require the toggling of one or more bits from only a single nibble may be compressed into 16-bit toggle instructions. The TGASM may also automatically align the remaining longer instructions in memory and insert appropriate "align" instructions in the code so as to ensure that each such instruction can be fetched in a single memory access.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

The invention claimed is:

1. A method of generating a digital signal pattern at M outputs, comprising:
   receiving an instruction including two fields,
      a first field identifying a first set of N bits which are a subset of the M outputs subject to the instruction, wherein N is less than M, and
      a second field corresponding to states of respective subset outputs identified in the first field;
   for each subset output:
      if a bit in the second field for the respective output is in a first state, then toggling a signal at the respective output, and
      if the bit in the second field for the respective output is in a second state, then keeping the signal in a same state at the respective output;
   counting a number of subset outputs that are toggled;
   based on a comparison between the number of subset outputs and a toggle count value that sets a minimum value for an event, outputting the digital signal pattern at the M outputs including the subset outputs that were either toggled or kept in the same state as before the event, and the remaining M outputs not included in the subset that are kept at a same state as before the event.

2. The method of claim 1, wherein the instruction is a first instruction and the event is a first event, and the method further comprises:
   receiving a second instruction;
   based on the second instruction, identifying a second subset of the M outputs for which the signals thereon are to be toggled upon an occurrence of a second event; and
   upon the occurrence of the second event, toggling the signals at the identified second subset outputs.

3. The method of claim 2, wherein the second instruction includes twice as many bits as the first instruction.

4. The method of claim 2, wherein the subset is a first subset, and the method further comprises:
   receiving a third instruction including two fields,
      a first field identifying a first set of X bits which are a second subset of the M outputs subject to the instruction, wherein X is less than M, and
      a second field corresponding to states of respective second subset outputs identified in the first field;
   for each second subset output:
      if a bit in the second field for the respective output is in a first state, then toggling a signal at the respective output, and
      if the bit in the second field for the respective output is in a second state, then keeping the signal in a same state at the respective output;
   outputting the digital signal pattern at the M outputs including the second subset outputs that were either toggled or kept in the same state as before the third event, and the remaining M outputs not included in the subset that are kept at a same state as before the event.

5. The method of claim 4, wherein the number of bits included in the second instruction is an integer multiple of the number of bits included in the first instruction, and the number of bits included in the third instruction is an integer multiple of the number of bits included in the first instruction.

6. The method of claim 1, wherein the instruction is a first instruction and the event is a first event, and the method further comprises:
   receiving a second instruction including two fields,
      a first field identifying a second subset of the M outputs subject to the instruction, and
      a second field corresponding to states of respective second subset outputs;
   for each second subset output:
      if a bit in the second field for the respective output is in a first state, then toggling a signal at the respective output, and
      if the bit in the second field for the respective output is in a second state, then keeping the signal in a same state at the respective output;
   outputting the digital signal pattern at the M outputs comprising the second subset outputs including the toggled and kept signals, and the remaining M outputs not included in the second subset that are kept at a same state as before the event.

7. The method of claim 1, further comprises determining if the event has occurred by a number of clock cycles elapsing following the receiving of the instruction.

8. The method of claim 7, further comprising a step of:
   identifying the number of clock cycles based upon a third set of bits included in the instruction.

9. The method of claim 7, further comprising a step of:
   identifying the number of clock cycles based on a register.

10. The method of claim 9, further comprising a step of:
    identifying the register based upon at least one bit included in the first instruction.

11. An apparatus for generating a digital signal pattern, comprising:
    M outputs; and
    a circuit configured to:
       receive an instruction including two fields,
          a first field identifying a first set of N bits which are a subset of the M outputs subject to the instruction, wherein N is less than M, and
          a second field corresponding to states of respective subset outputs identified in the first field;
       for each subset output:
          if a bit in the second field for the respective output is in a first state, then toggle a signal at the respective output, and
          if the bit in the second field for the respective output is in a second state, then keep the signal in a same state at the respective output;
       counting a number of subset outputs that are toggled;
       based on a comparison between the number of subset outputs and a toggle count value that sets a minimum value for an event, output the digital signal pattern at the M outputs including the subset outputs that were either toggled or kept in the same state as before the event, and the remaining M outputs not included in the subset that are kept at a same state as before the event.

12. The apparatus of claim 11, wherein the instruction is a first instruction and the event is a first event, and the circuit further configured to:
    receive a second instruction;
    based on the second instruction, identify a second subset of the M outputs for which the signals thereon are to be toggled upon an occurrence of a second event; and
    upon the occurrence of the second event, toggle the signals at the identified second subset outputs.

13. The apparatus of claim 12, wherein the second instruction includes twice as many bits as the first instruction.

14. The apparatus of claim 12, wherein the subset is a first subset, and the circuit further configured to:
    receive a third instruction including two fields, a first field identifying a first set of X bits which are a second subset of the M outputs subject to the instruction, wherein X is less than M, and a second field corresponding to states of respective second subset outputs identified in the first field;

for each second subset output:

if a bit in the second field for the respective output is in a first state, then toggle a signal at the respective output, and if the bit in the second field for the respective output is in a second state, then keep the signal in a same state at the respective output;

output the digital signal pattern at the M outputs including the second subset outputs that were either toggled or kept in the same state as before the event, and the remaining M outputs not included in the subset that are kept at a same state as before the event.

15. The apparatus of claim 14, wherein the number of bits included in the second instruction is an integer multiple of the number of bits included in the first instruction, and the number of bits included in the third instruction is an integer multiple of the number of bits included in the first instruction.

16. The apparatus of claim 11, wherein the instruction is a first instruction and the event is a first event, and the circuit further configured to:

receive a second instruction including two fields, a first field identifying a second subset of the M outputs subject to the instruction, and a second field corresponding to states of respective subset outputs;

for each second subset output:

if a bit in the second field for the respective output is in a first state, then toggle a signal at the respective output, and if the bit in the second field for the respective output is in a second state, then keep the signal in a same state at the respective output;

output the digital signal pattern at the M outputs including the second subset outputs that were either toggled or kept in the same state as before the event, and the remaining M outputs not included in the second subset that are kept at a same state as before the event.

17. The apparatus of claim 11, wherein determining if the event has occurred by a number of clock cycles elapsing following the receiving of the instruction.

18. The apparatus of claim 17, wherein identifying the number of clock cycles based upon a third set of bits included in the instruction.

19. The apparatus of claim 17, wherein identifying the number of clock cycles based on a register.

20. The apparatus of claim 19, wherein identifying the register based upon at least one bit included in the first instruction.

21. A method for generating a digital signal pattern at M outputs, comprising steps of:

receiving a first instruction from memory bits indicating a first subset of the M outputs subject to the first instruction, wherein the first subset is a total of N outputs, N is less than M;

based on the first instruction, identifying which of the first subset outputs are to be toggled upon an occurrence of a first event;

upon the occurrence of the first event, toggling the signals on the identified first subset outputs;

receiving a second instruction from memory bits indicating a second subset of the M outputs subject to the second instruction;

based on the second instruction, identifying which of the second subset outputs are to be toggled upon an occurrence of a second event;

upon the occurrence of the second event, toggling the signals identified second subset outputs;

counting a number of subset outputs that were toggled; and based on a comparison between the number of subset outputs and a toggle count value, outputting the digital signal pattern at the M outputs including the first and second subset outputs that were either toggled and kept signals, and the remaining M outputs not included in the first and second subsets that are kept at a same state as before the second event.

22. The method of claim 21, further comprising steps of:

determining the first event by a first number of clock cycles elapsing following receiving of the first instruction; and determining the second event by a second number of clock cycles elapsing following receiving of the second instruction.

23. The method of claim 22, further comprising a step of:

determining the first number of clock cycles based upon a register.

24. The method of claim 23, further comprising a step of:

identifying the register based upon at least one bit included in the first instruction.

25. The method of claim 21, wherein the second instruction includes twice as many bits as the first instruction.

* * * * *